United States Patent
Henkemans

(10) Patent No.: US 6,830,681 B2
(45) Date of Patent: Dec. 14, 2004

(54) DEVICE AND METHOD FOR HOLDING WATER FOR ACCOMMODATING AND GROWING AQUATIC ORGANISMS

(75) Inventor: Peter Alexander Henkemans, Oegstgeest (NL)

(73) Assignee: Ecodeco B.V., Oegstgesst (NL)

( * ) Notice: Subject to any disclaimer, the term of this patent is extended or adjusted under 35 U.S.C. 154(b) by 0 days.

(21) Appl. No.: 10/469,317

(22) PCT Filed: Mar. 7, 2002

(86) PCT No.: PCT/NL02/00152

§ 371 (c)(1),
(2), (4) Date: Aug. 28, 2003

(87) PCT Pub. No.: WO02/069701

PCT Pub. Date: Sep. 12, 2002

(65) Prior Publication Data

US 2004/0074840 A1 Apr. 22, 2004

(30) Foreign Application Priority Data

Mar. 8, 2001 (NL) .............................. 1017537

(51) Int. Cl.[7] .......................... A01K 63/04; C02F 3/28
(52) U.S. Cl. ................. 210/169; 210/143; 210/206; 210/259; 210/416.2; 210/905; 119/260
(58) Field of Search ............................ 210/169, 198.1, 210/205, 206, 220, 252, 259, 416.1, 416.2, 143, 905; 119/260, 261

(56) References Cited

U.S. PATENT DOCUMENTS

| | | | |
|---|---|---|---|
| 3,971,338 A | 7/1976 | Alexson | |
| 4,211,183 A | 7/1980 | Hoult | |
| 4,414,919 A * | 11/1983 | Hess | 119/259 |
| 4,469,048 A * | 9/1984 | Dugan et al. | 119/211 |
| 4,620,929 A | 11/1986 | Hofmann | |
| 4,995,980 A | 2/1991 | Jaubert | |
| 5,054,424 A * | 10/1991 | Sy | 119/260 |
| 5,961,831 A | 10/1999 | Lee | |
| 6,447,681 B1 * | 9/2002 | Carlberg et al. | 210/602 |
| 6,630,067 B2 * | 10/2003 | Shieh et al. | 210/139 |
| 6,730,226 B2 * | 5/2004 | Takada | 210/630 |

FOREIGN PATENT DOCUMENTS

| | | | |
|---|---|---|---|
| JP | 11-262344 A | * | 9/1999 |
| JP | 2000-279991 A | * | 10/2000 |

* cited by examiner

Primary Examiner—Fred G. Prince
(74) Attorney, Agent, or Firm—Todd Deveau; Thomas, Kayden, Horstemeyer & Risley LLP

(57) ABSTRACT

Device and method for keeping and growing aquatic organisms by optimizing the microbiological treatment of water. The device comprises a first chamber for holding oxygen-depleted water and a second chamber for holding oxygen-rich water, the first and second chambers being separated from one another by a porous substrate which comprises micro-organisms. In the active state, water circulates in the device across the porous substrate for the purpose of microbiological treatment. Using means for conditioning the oxygen-depleted water and oxygen-rich water next to one another results in the composition of the water being effectively kept at optimum values for the microbiological treatment of the water. In addition, sediment comprising waste matter is removed by separation means which are incorporated in an oxygen-depleted circuit and in an oxygen-rich circuit; this prevents the water from becoming turbid and prevents the accumulation of waste matter in the form of sediment. The present invention is so effective at controlling the composition of water that the water is able to maintain an oligotrophic environment for growing reef organisms, such as, inter alia, corals, sponges, molluscs, crustaceans and fish.

24 Claims, 4 Drawing Sheets

DEVICE AND METHOD FOR HOLDING WATER FOR ACCOMMODATING AND GROWING AQUATIC ORGANISMS

RELATED APPLICATION

This application claims priority to and the benefit of NL1017537 filed Mar. 8, 2001.

FIELD OF THE INVENTION

The invention relates to a device for holding water for accommodating and growing aquatic organisms, comprising a first chamber for holding oxygen-depleted water and a second chamber for holding oxygen-rich water, and a porous substrate which comprises micro-organisms and is in contact with the oxygen-depleted water and the oxygen-rich water.

The porous substrate which comprises micro-organisms in the device described here may be made from a very wide range of different porous materials, but it is preferable for the porous substrate to be made from a material which provides a large surface area for the growth and adhesion of micro-organisms, such as for example coarse sand, gravel, aragonite, coral fragments or coarse-ground shells.

The organisms which are grown and kept using the above device are intended in particular to be macro-organisms, such as for example fish, water plants, corals, sponges and molluscs; the device obviously also provides a suitable climatic environment for micro-organisms which are situated in and outside the porous substrate.

BACKGROUND OF THE ART

A device of this type is known from U.S. Pat. No. 4,995,980 and makes use of the principle that waste materials, originating, inter alia, from food for the macro-organisms kept in the water, diffuse from the oxygen-rich water to the substrate and the oxygen-depleted water, where the waste matter, in particular nitrate and nitrite, is reduced, so that the concentration of waste matter is limited. However, a drawback of this device is that ultimately waste matter still accumulates, and this accumulation may be harmful to the macro-organisms kept in the water. Moreover, this accumulation of waste matter results in the water becoming turbid, which is undesirable if the device is used to display animals and/or plants in the oxygen-rich water. In addition, the device has the drawback that the system is relatively unstable, i.e., for example in the event of the death of a macro-organism, a suddenly occurring large supply of a contaminating carbon source from the oxygen-rich water to the oxygen-depleted water, oxidation of the contaminating carbon source by micro-organisms leads to the oxygen-depleted water becoming completely anaerobic. Under completely anaerobic conditions, micro-organisms can form $H_2S$, which can poison and, kill the macro-organisms which are present.

SUMMARY OF THE INVENTION

It is an object of the invention to overcome the described drawbacks, and to this end the device is characterized in that the first chamber is formed by at least part of the substrate, and a first circuit, having ail inlet and an outlet, which are in communication with the first chamber, is connected to at least the first chamber, and there are first passage means for passing oxygen-depleted water through the first circuit, and means for conditioning the oxygen-depleted water are in contact therewith.

The pores of the porous substrate will usually also contain oxygen-depleted water, which means that part of the second chamber lies within the porous substrate. When the porous substrate is laid directly onto the bottom of the device, the second chamber will lie substantially entirely within the porous substrate. Obviously, the invention also relates to a device as described in U.S. Pat. No. 4,995,980; it is the intention for the invention also to include embodiments of this type, in which the substrate or parts of the substrate and the chamber for holding oxygen-depleted water are positioned vertically along a side wall of the device.

In the present context, the term conditioning is understood to mean providing optimum conditions for the reaction of waste matter. The optimum condition can be judged from aspects such as pH, oxygen concentration, nitrogen concentration, carbon concentration, etc. The various characteristic features of the water and their application will be dealt with below.

The use of means which condition the oxygen-depleted water allows the condition of the oxygen-depleted water to be kept in a state which is optimum for the conversion of waste matter, so that the conversion of waste matter is influenced and increased.

In this context, it is expedient to increase the stability of the system by increasing the total volume of oxygen-depleted water. A large volume has a buffering action, since the composition of a large volume changes more slowly. This increase is achieved by incorporating the means for conditioning the oxygen-depleted water in a first circuit through which oxygen-depleted water passes.

In addition, the passage of oxygen-depleted water through the first circuit makes it possible to generate a first flow beneath the porous substrate, which comprises micro-organisms, in such a manner that pressure differences across the porous substrate, which comprises micro-organisms, are formed, generating a second flow of water through the porous substrate which comprises micro-organisms. The second flow can, inter alia, control the oxygen concentration in the oxygen-depleted water, the oxygen concentration preferably being kept between 1 ppm and 4 ppm. At an oxygen concentration of 1–4 ppm, there will be no formation of poisonous sulphur compounds, such as $H_2S$, while reduction of nitrate and nitrite to form gaseous nitrogen by means of micro-organisms continues to take place.

In an expedient embodiment of the device, the means for conditioning the oxygen-depleted water comprise measurement and control means for measuring and controlling the composition of the oxygen-depleted water, and separating means for separating out sediment which is entrained in the first circuit.

As has been stated, it is essential for the quality of the oxygen-depleted water for the various characteristic parameters thereof to be controlled; in addition, for the aesthetic appearance of the device it is important to limit the quantity of sediment.

In an expedient embodiment, the measurement and control means comprise instruments selected from:

a) means for measuring the oxygen concentration
b) means for measuring the water temperature
c) means for measuring the pH
d) means for measuring the concentration of sulphur compounds
e) means for measuring the nitrogen concentration
f) means for measuring the carbon concentration
g) means for measuring the sediment concentration
h) means for measuring the redox potential i) means for measuring the mineral concentration
j) means for injecting conditioning medium
k) control means for influencing the operation of the first passage means and/or the means for injecting conditioning medium into the first circuit in response to a deviation from a predetermined value which is recorded by one or more of the means for measuring constituents as described in a to j.

The advantage of an embodiment of this type is that, on account of the coupling of the control means to the measurement means, means for injecting conditioning medium and the first passage means, the control of the conditions of the oxygen-depleted water is effected automatically, with the result that continuous inspection by human observation is no longer required.

The control means may, for example, comprise a computer which comprises a program which, as a function of one or more measured water quality values and the deviation from a set value thereof, controls the passage means, such as pumps or injection means, in order to ensure that the set value is restored.

The injection means are used when the pH or the carbon concentration of the oxygen-depleted water deviates excessively from the set value; acid/base or a carbon feed source can be injected as required. The injection means per se generally comprise a storage vessel containing the agent which is to be added, a pump, a line and a nozzle opening out into the device.

The abovementioned measurement and control means may, for example, be incorporated in the first chamber and perform their task in this chamber. Obviously, the measured values for the various characteristic variables, especially in the case of large volumes of the first chamber, are primarily representative of the condition at the location of the measurement means. If control is desired on the basis of mean values, the embodiment described below is of importance.

In this embodiment, the measurement and control means and the separation means are incorporated in the first circuit. The circulation leads to mixing and homogenization and, as a result, the composition of the oxygen-depleted water in the first chamber can easily be kept within predetermined limits.

In an attractive embodiment, the separation means comprise a settling tank with an outlet. This has the advantage that, in particular, sediment which comprises dead biomass and which has settled out of the oxygen-rich water to the oxygen-depleted water, is deposited in the settling tank and can easily be removed. In this way, the living biomass is left behind in the oxygen-depleted water. Since the living biomass reduces nitrate and nitrite to nitrogen gas, this embodiment is particularly advantageous with a view to maintaining the nitrate/nitrite-reducing capacity of the living biomass in the oxygen-depleted water.

In a particularly advantageous embodiment, the settling tank is cylindrical in shape, with an inflow opening and an outflow opening, at least the inflow opening being positioned tangentially at the top of the settling tank, and flow-inhibiting means being present at the underside.

With a settling tank of this type, sediment which comprises dead biomass can be removed efficiently; this is possible on account of the fact that the tangentially positioned inflow opening generates a circulating flow in the settling tank, sediment located in the circulating flow being deposited against the wall of the settling tank and then sinking downwards along the wall, into the water which is stationary on account of the flow-inhibiting means, down to the bottom.

Another expedient embodiment of the flow-inhibiting means is produced if the settling tank is shaped conically in the direction of the underside. The advantage of this is that precipitated sediment from the water, which is decelerated by the conical shape, is collected in the tip of the conically shaped part of the settling tank, which simplifies removal of deposited sediment.

In a following embodiment, in the first chamber there are tubes which run substantially parallel and are alternately connected to the inlet and outlet of the first circuit, the tubes comprising lateral perforations. This allows rapid rinsing through the first chamber in order to rapidly condition the oxygen-depleted water. Suitable operation of the passage means optionally allows pressure differences to be formed across the substrate, thus promoting or preventing exchange of matter across the porous substrate.

In an embodiment which is also expedient, the boundary of the first chamber and the substrate is undulating and, at least locally, comprises perforations which only allow water and sediment to pass through. This is advantageous since there is space for laying pipes below and in the direction of the corrugations.

In an expedient embodiment, the boundary is a corrugated plate with peaks and valleys, and perforations are present at least in the valleys.

This has the advantage that the device is simple to make, by simply positioning a prefabricated corrugated plate and applying a porous substrate to it, for example by laying sand or gravel on top of the corrugated plate.

In a suitable embodiment, the tubes run parallel to the undulations of the corrugated plate. This makes it very easy to position the pipes and the corrugated plate.

In a particular variant of the above embodiment, the pipes lie beneath the corrugated plate. This allows more efficient control of the condition of the oxygen-depleted water which is situated beneath this plate, as a result of the tubes being laid in the corrugations.

Obviously, these tubes are not positioned arbitrarily, and consequently, in an embodiment which is simple to produce, the tubes lie substantially at the location of the perpendicular plane which passes through the peaks of the corrugated plate. This has the advantage that positioning beneath the plate can be carried out efficiently.

Hitherto, nothing has been said about the positioning of the circuit; it may be external but, in the case of very large devices, may also be internal, in which case the water inside the circuit per se is separated from the water in the first chamber.

However, it is advantageous for the first circuit to be an external circuit. This has the advantage that the circuit and all the means which are incorporated therein are freely accessible for manual operations when the device is in the active state.

In an important further embodiment, a second circuit is likewise connected to the second chamber, the inlet and outlet of which second circuit are in communication with the second chamber, and there are second passage means for passing through oxygen-rich water, and second means for conditioning oxygen-rich water are in contact therewith. This has the advantage that the oxygen-rich water can be conditioned independently of the conditioning means associated with the oxygen-depleted water.

In an attractive further embodiment, the second means for conditioning the oxygen-rich water comprise measurement and control means for measuring and controlling the composition of the oxygen-rich water, and separation means for separating out sediment which is entrained in the second circuit. The condition of the oxygen-rich water is expediently controlled with the aid of measurement and control means.

Measurement and control means of this type are advantageously selected from:

1) means for measuring the oxygen concentration
2) means for measuring the water temperature
3) means for measuring the pH
4) means for measuring the concentration of sulphur compounds
5) means for measuring the nitrogen concentration
6) means for measuring the carbon concentration
7) means for measuring the sediment concentration
8) means for measuring the redox potential
9) means for measuring the mineral concentration
10) means for injecting conditioning medium
11) control means for influencing the operation of the second passage means and/or the means for injecting conditioning medium into the second circuit in response to a deviation from a predetermined value which is recorded by one or more of the means for measuring constituents in accordance with 1 to 10.

This embodiment has the advantage that, if the condition of the oxygen-rich water deviates from a predetermined value, this deviation is corrected automatically, with the result that constant regular human inspection is no longer required.

As has been stated above, the control means are controlled by a suitably programmed computer. As has been indicated earlier in connection with the oxygen-depleted region, the computer holds a program which compares a measured variable with a predetermined desired value (set value), and controls the second passage means and/or the means for injecting conditioning medium in such a manner that the set value is restored or is approached in steps. The injection means may, for example, be used for air, oxygen or, as will be discussed below, ozone-rich gas. The computer which controls operation of the oxygen-rich circuit may be separate from the computer which controls the operation of the oxygen-depleted circuit, or, in a preferred embodiment, the computers may also be combined and linked in order to match the condition of the oxygen-rich water and of the oxygen-depleted water to one another.

In an expedient embodiment, the measurement and control means, and also separation means, are incorporated in the second circuit.

To control the condition of the oxygen-rich water, it is expedient to use measurement and control means in a second circuit; it is also desirable for waste matter contained in the oxygen-rich water in the form of sediment to be separated from oxygen-rich water, in order to prevent the water from becoming turbid.

In an expedient embodiment, the separation means comprise a settling tank with an outlet.

This is expedient for removing turbidity from the oxygen-rich water directly, i.e. not via the first chamber containing oxygen-depleted water, so that aquatic animals and/or plants which are on display can be made more pleasant to look at.

In a particularly expedient embodiment, the settling tank is cylindrical in shape, with an inflow opening and an outflow opening, at least the inflow opening being positioned tangentially at the top of the settling tank, and flow-inhibiting means being present at the bottom.

In a settling tank of this type, only the dead sediment is removed efficiently, so that the living biomass which is present remains in the oxygen-rich water. This is important on account of the oxidation of waste matter which, in unoxidized form (e.g. $NH_3$), is more disadvantageous for macro-organisms. The oxidation is carried out by the living biomass in the oxygen-rich water; therefore, by maintaining the living biomass, the oxidation of waste matter will continue to take place at a higher level in the oxygen-rich water than if the living biomass were to be removed.

In a following advantageous embodiment, the settling tank is shaped conically in the direction of the underside.

On account of the conical shape, precipitated sediment in the settling tank is collected in a tip, which facilitates removal of the said precipitated sediment.

In another advantageous embodiment, a protein skimmer is incorporated in the second circuit.

This has the advantage that an excess of proteins, which has formed, as a result of the death and decomposition of a macro-organism and can lead to considerable growth of algae, is removed rapidly.

In a preferred embodiment, the second circuit is an external circuit.

The advantage of this is that the circuit and all instruments with which the circuit is provided are relatively accessible for manual operations when the device is in the active state.

The invention also relates to a method for keeping and growing aquatic macro-organisms, comprising the steps of:

providing a suitable device comprising a first chamber for holding oxygen-depleted water and a second chamber for holding oxygen-rich water, the first and second chambers being separated from one another by a porous substrate which comprises micro-organisms, discharging sediment from the first chamber feeding oxygen to the second chamber, placing aquatic macro-organisms in the second chamber, characterized in that the device is a device according to the invention as described above.

Making use of a device according to the present invention allows the composition of the water to be kept more accurately within defined values, which also allows macro-organisms which are very sensitive to variations in the water of their environment to be grown and kept. The condition of water can be controlled so well that reef organisms, such as, inter alia, corals, sponges, molluscs, crustaceans and fish, can be grown without problems.

BRIEF DESCRIPTION OF THE DRAWINGS

The invention will now be explained with reference to the drawing, in which.

DETAILED DESCRIPTION OF THE DRAWINGS

Figure 1:
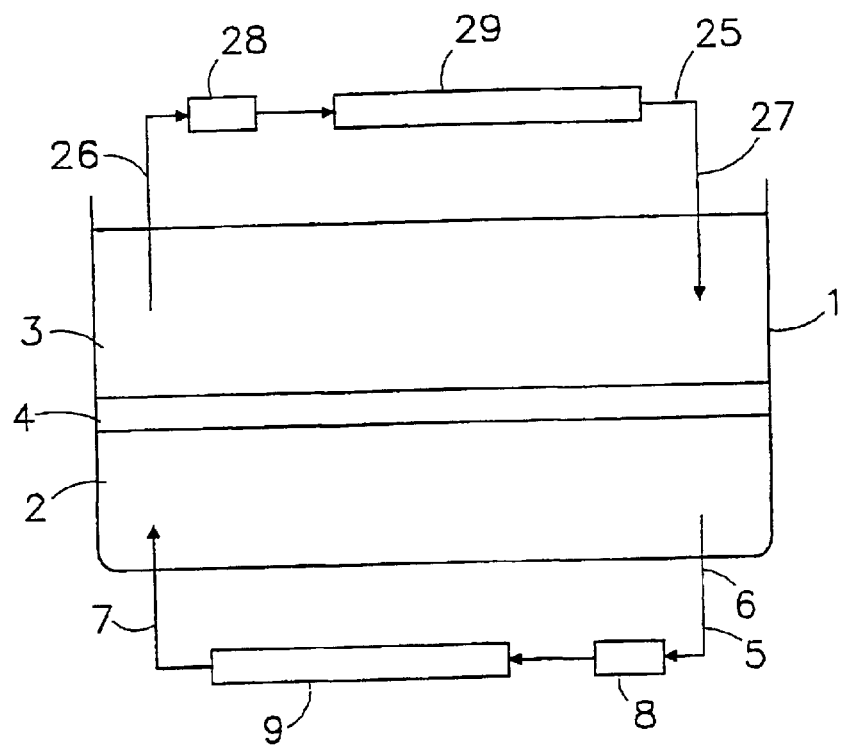
FIG. 1 shows a simplified illustration of a device according to the invention.

The device 1 shown in FIG. 1 comprises a first chamber 2 for holding oxygen-depleted water and a second chamber 3 for holding oxygen-rich water, and a porous substrate 4, which comprises micro-organisms and separates the first chamber 2 from the second chamber 3. The first chamber 2 is provided with an external first circuit 5 with an inlet 6 and an outlet 7, first passage means 8, such as a pump, being present in the first circuit, as well as means 9 for conditioning the oxygen-depleted water. The second chamber 3 is provided with a second circuit 25, which is likewise external, the second circuit 25 comprising an inlet 26 and an outlet 27, and second passage means 28 and second means 29 for conditioning oxygen-rich water being incorporated in the second circuit 25. In a typical embodiment, the means 9 for conditioning the oxygen-depleted water comprise an oxygen-concentration meter, a pH meter, a calcium-concentration meter, a sulphur-concentration meter, a redox-potential meter, a carbon feed source injection means and carbon concentration measurement means. The carbon feed source is used as a feed for the nitrate/nitrite-converting organisms and may, for example, comprise sugar, alcohol, glycerol or acetic acid. Micro-organisms reduce nitrite/nitrate using the carbon feed source so as to form, inter alia, $CO_2$ and $N_2$, after which $N_2$ and $CO_2$ are released to the atmosphere via the oxygen-rich water. The means for conditioning the oxygen-rich water typically comprise aeration means, such as an air pump, an oxygen-concentration meter, a calcium-concentration meter and a protein-concentration meter.

Figure 2:
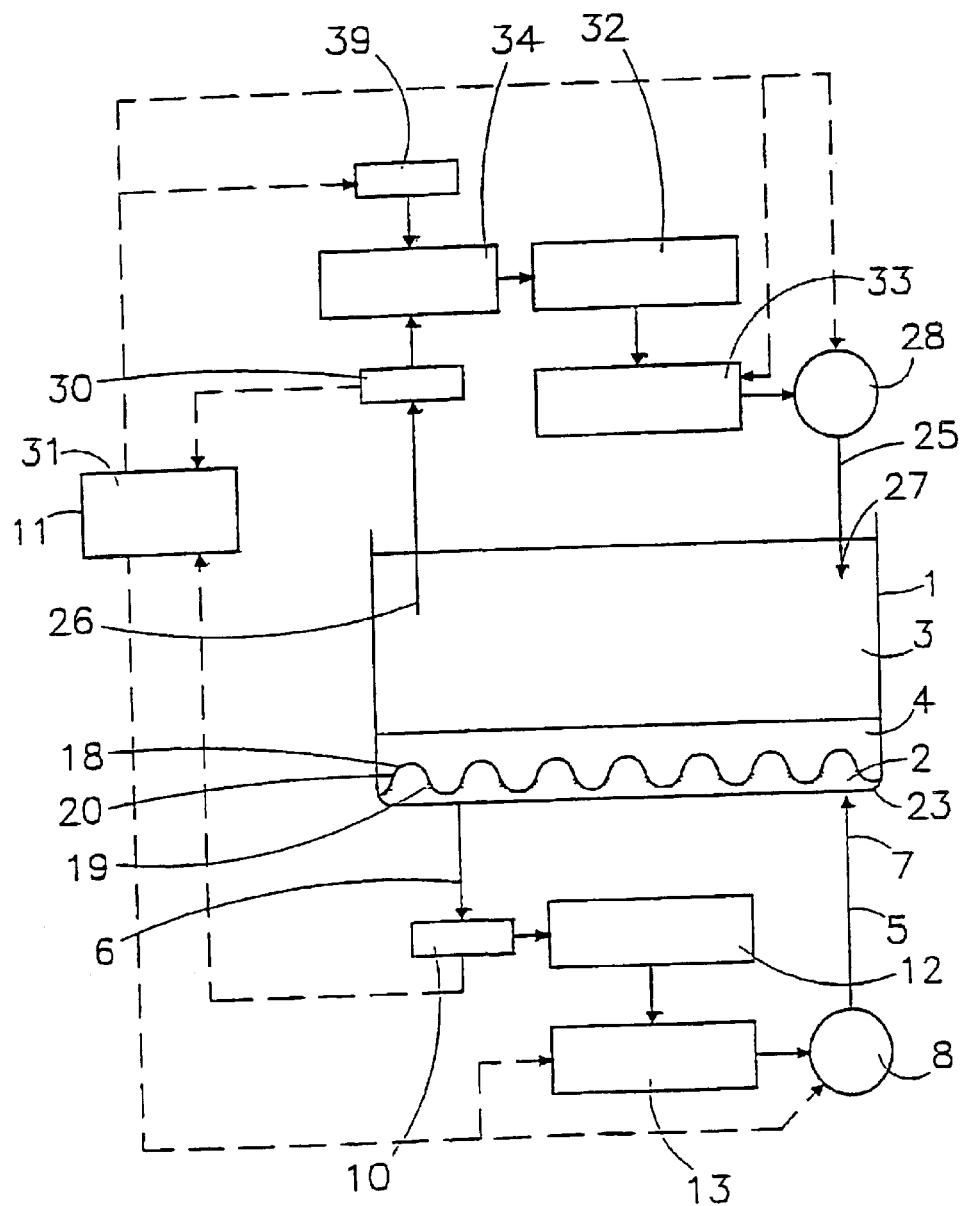
FIG. 2 shows an illustration of the device according to the invention in its entirety.

FIG. 2 shows an illustration of a device 1 in its entirety, having a first chamber 2 for holding oxygen-depleted water and a second chamber 3 for holding oxygen-rich water, as well as a porous substrate 4 which comprises micro-organisms and separates the first chamber 2 from the second chamber 3. The boundary 18 of the porous substrate 4, which comprises micro-organisms on the underside of the first chamber 2 is provided with a corrugated plate 20 with perforations 19 in the valleys 23. FIG. 2 also shows a first circuit 5, which is external, the first circuit 5 comprising an inlet 6 and an outlet 7, and first passage means 8, separation means 12, measurement means 10 and means 13 for injecting conditioning medium into the first circuit 5 are incorporated in the first circuit 5. Furthermore, the first circuit 5 comprises control means 11 which are coupled to the first passage means 8, the measurement means 10 and the means 13 for injecting conditioning medium into the first circuit 5. FIG. 2 also shows a second circuit 25 for oxygen-rich water, which is positioned externally and is provided with an inlet 26 and an outlet 27, in which second passage means 28, measurement means 30, separation means 32 and means 34 for injecting conditioning medium into the second circuit 25 are incorporated, and the second circuit 25 comprises control means 31 which are coupled to the measurement means 30, the second passage means 28 and the means 33 for injecting conditioning medium into the second circuit 25. Furthermore, the second circuit 25 is provided with a protein skimmer 34 with an ozone feed means 39.

A protein skimmer is a unit in which, using ozone-rich gas (for example ozone-enriched air), protein which is in the water is degraded or forms a foam which can be removed.

Figure 3:
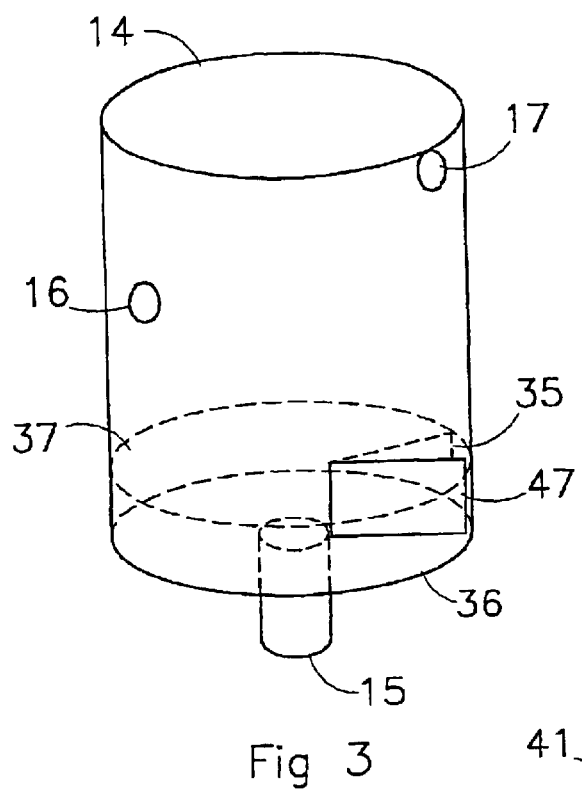
FIG. 3 shows a side view of a settling tank.

FIG. 3 shows a side view of a settling tank 14 with an inflow opening 16 and an outflow opening 17, the settling tank 14 being provided, beneath the inflow opening 16, with a section 37 which has flow-inhibiting means 35, such as plate-like elements 47, and an outlet 15 for removing sediment which is deposited at the bottom 36 of the settling tank.

Figure 4:
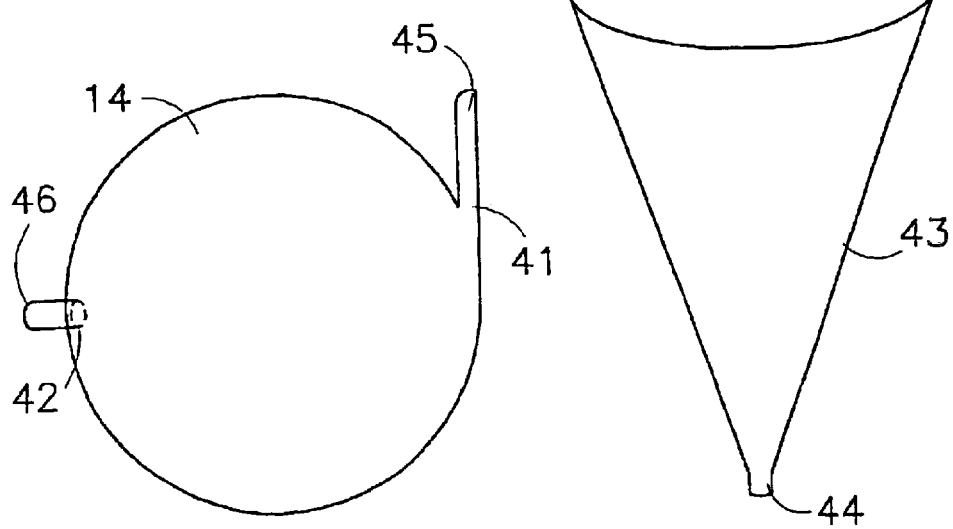
FIG. 4 shows a side view of a settling tank.

FIG. 4 shows a side view of a settling tank 14 with an inflow opening 41 and an outflow opening 42, a conically shaped section 43 at the bottom which is provided with a sediment outlet 44.

Figure 5:
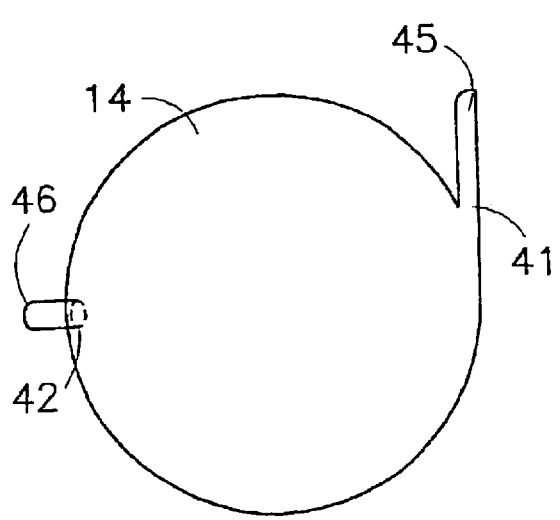
FIG. 5 shows a plan view of a settling tank.

FIG. 5 shows a plan view of a settling tank 14 with a tangentially positioned inflow opening 41 with an inlet line 45 and outflow opening 42 with an outlet line 46. The device shown in FIG. 4 advantageously has a bottom section which tapers conically downwards and is, for example, a hydrocyclone.

Figure 6:
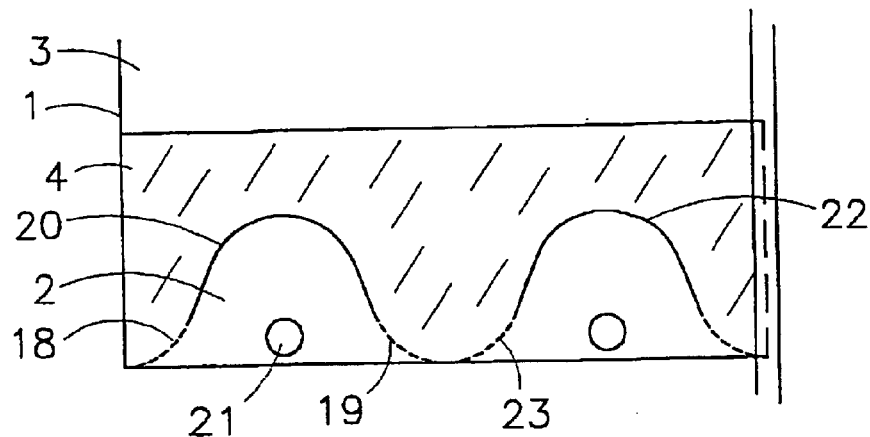
FIG. 6 shows a detail of the device according to the invention.

FIG. 6 shows a detail of the device 1 having a first chamber 2 for holding oxygen-depleted water and a second chamber 3 for holding oxygen-rich water, a porous substrate 4 which comprises micro-organisms and separates the first chamber 2 from the second chamber 3, the boundary 18 of the porous substrate 4, which comprises micro-organisms, being provided, on the side of the first chamber 2, with a corrugated plate 20 with peaks 22 and valleys 23, the corrugated plate 20 being provided with perforations 19 in the valleys 23. In addition, tubes 21 running beneath the corrugations can be seen.

Figure 7:
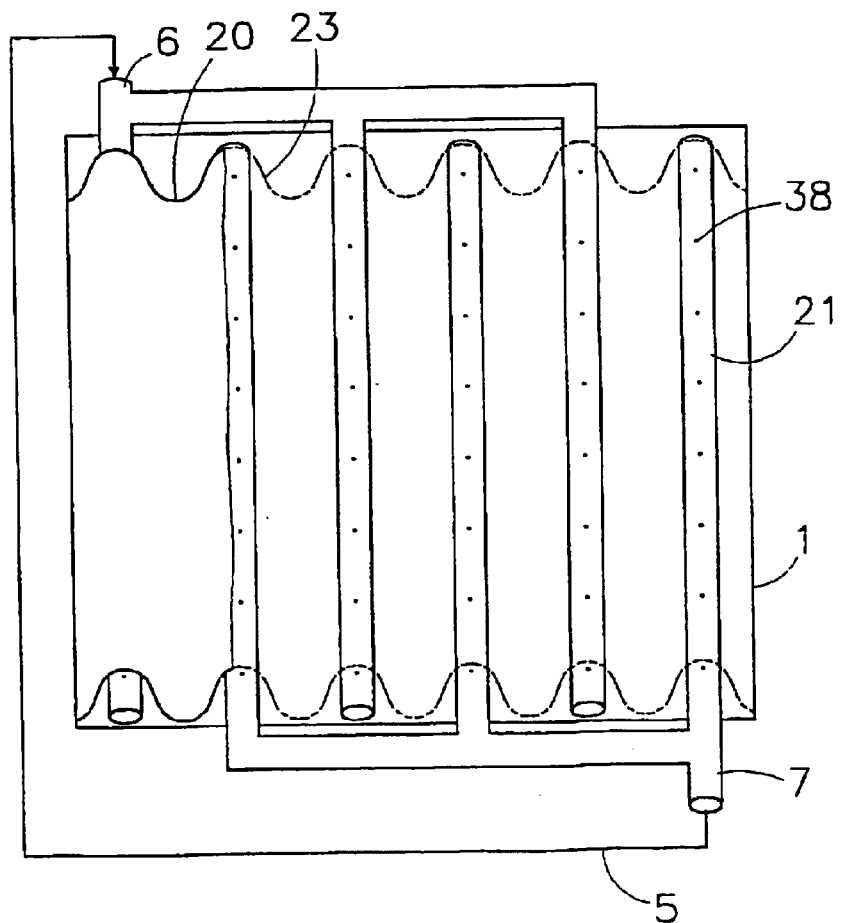
FIG. 7 shows a plan view of the device according to the invention.

FIG. 7 shows a plan view of a device 1 as shown in FIG. 6, beneath the porous substrate (not shown), having a first circuit 5 with an inlet 6 and an outlet 7 and tubes 21 which are positioned parallel in a device 1, the tubes 21, which are provided with lateral perforations 38, being alternately connected to the inlet 6 and the outlet 7 of the first circuit 5 and lying between the valleys 23 of the corrugated plate 20.

What is claimed is:

1. Device for holding water for accommodating and growing aquatic organisms, comprising a first chamber for holding oxygen-depleted water and a second chamber for holding oxygen-rich water, and a porous substrate which comprises micro-organisms and is in contact with the oxygen-depleted water and the oxygen-rich water, wherein the first chamber is formed by at least part of the substrate, and a first circuit, having an inlet and an outlet, which are in communication with the first chamber, is connected to at least the first chamber, and there are first passage means for passing oxygen-depleted water through the first circuit, and means for conditioning the oxygen-depleted water are in contact therewith.

2. Device according to claim 1, wherein the means for conditioning the oxygen-depleted water comprise measurement and control means for measuring and controlling the composition of the oxygen-depleted water, and separating means for separating out sediment which is entrained in the first circuit.

3. Device according to claim 2, wherein the measurement and control means comprises one or more instruments selected from:

a) means for measuring the oxygen concentration
b) means for measuring the water temperature
c) means for measuring the pH
d) means for measuring the concentration of sulphur compounds
e) means for measuring the nitrogen concentration
f) means for measuring the carbon concentration
g) means for measuring the sediment concentration
h) means for measuring the redox potential
i) means for measuring the mineral concentration
j) means for injecting conditioning medium
k) control means for influencing the operation of the first passage means and/or the means for injecting conditioning medium into the first circuit in response to a deviation from a predetermined value which is recorded by one or more of the means for measuring constituents as described in a to j.

4. Device according to claim 2, wherein the measurement and control means, and also separation means, are incorporated in the first circuit.

5. Device according to claim 2, wherein the separation means comprise a settling tank with an outlet.

6. Device according to claim 5, wherein the settling tank is cylindrical in shape, with an inflow opening and an outflow opening, at least the inflow opening being positioned tangentially at the top of the settling tank, and flow-inhibiting means being present at the underside.

7. Device according to claim 6, wherein the settling tank is shaped conically in the direction of the underside.

8. Device according to claim 1, wherein in the first chamber there are tubes which run substantially parallel and are alternately connected to the inlet and outlet of the first circuit, the tubes comprising lateral perforations.

9. Device according to claim 1, wherein the boundary of the first chamber and the substrate is undulating and, at least locally, comprises perforations which only allow water and sediment to pass through.

10. Device according to claim 9, wherein the boundary is a corrugated plate with peaks and valleys, and perforations are present at least in the valleys.

11. Device according to claim 10, wherein the tubes run parallel to the undulations of the corrugated plate.

12. Device according to claim 11, wherein the tubes lie below the corrugated plate.

13. Device according to claim 12, wherein the tubes lie substantially at the location of the perpendicular plane which passes through the peaks of the corrugated plate.

14. Device according to claim 1, wherein the first circuit is an external circuit.

15. Device according to claim 1, wherein also a second circuit is connected to the second chamber, the inlet and outlet of which second circuit are in communication with the second chamber, and there are second passage means for passing through oxygen-rich water, and second means for conditioning oxygen-rich water are in contact therewith.

16. Device according to claim 15, wherein the second means for conditioning the oxygen-rich water comprise measurement and control means for measuring and controlling the composition of the oxygen-rich water, and separation means for separating out sediment which is entrained in the second circuit.

17. Device according to claim 16, wherein the measurement and control means comprises one or more instruments selected from:

1) means for measuring the oxygen concentration
2) means for measuring the water temperature
3) means for measuring the pH
4) means for measuring the concentration of sulphur compounds
5) means for measuring the nitrogen concentration
6) means for measuring the carbon concentration
7) means for measuring the sediment concentration
8) means for measuring the redox potential
9) means for measuring the mineral concentration
10) means for injecting conditioning medium
11) control means for influencing the operation of the second passage means and/or the means for injecting conditioning medium into the second circuit in response to a deviation from a predetermined value which is recorded by one or more of the means for measuring constituents in accordance with 1 to 10.

18. Device according to claim 16, wherein the measurement and control means, and also separation means are incorporated in the second circuit.

19. Device according to claim 16, wherein the separation means comprise a settling tank with an outlet.

20. Device according to claim 19, wherein the settling tank is cylindrical in shape, with an inflow opening and an outflow opening, at least the inflow opening being positioned tangentially at the top of the settling tank, and flow-inhibiting means being present at the bottom.

21. Device according to claim 20, wherein the settling tank is shaped conically in the direction of the underside.

22. Device according to claim 15, wherein a protein skimmer is incorporated in the second circuit.

23. Device according to claim 15, wherein the second circuit is an external circuit.

24. Method for keeping and growing aquatic macro-organisms, comprising the steps of:

providing a suitable device comprising a first chamber for holding oxygen-depleted water and a second chamber for holding oxygen-rich water, the first and second chambers being separated from one another by a porous substrate which comprises micro-organisms, discharging sediment from the first chamber feeding oxygen to the second chamber, placing aquatic macro-organisms in the second chamber, wherein the device is a device according to claim 1.

* * * * *